United States Patent
Graf et al.

(10) Patent No.: US 9,253,723 B2
(45) Date of Patent: Feb. 2, 2016

(54) COMMUNICATION DEVICES, RADIO SWITCH AND METHOD FOR COMMUNICATION

(71) Applicant: ZF Friedrichshafen AG, Friedrichshafen (DE)

(72) Inventors: Alexander Graf, Friedrichshafen (DE); Hans-Jürgen Hanft, Pegnitz (DE); Thomas Boethe, Flossenbürg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 181 days.

(21) Appl. No.: 14/069,581

(22) Filed: Nov. 1, 2013

(65) Prior Publication Data

US 2014/0146729 A1 May 29, 2014

(30) Foreign Application Priority Data

Nov. 23, 2012 (DE) .......................... 10 2012 221 410

(51) Int. Cl.
*H04J 3/06* (2006.01)
*H04W 52/02* (2009.01)

(52) U.S. Cl.
CPC ............ *H04W 52/0209* (2013.01); *Y02B 60/50* (2013.01)

(58) Field of Classification Search
CPC ....... G01F 15/063; G06F 21/72; G06F 21/79; G08B 13/149; H04L 9/0637; H04L 2209/80
USPC .................. 340/539.26; 455/39; 713/193
See application file for complete search history.

(56) References Cited

U.S. PATENT DOCUMENTS

| | | | |
|---|---|---|---|
| 5,455,570 A | 10/1995 | Cook et al. | |
| 7,392,022 B2 | 6/2008 | Albsmeier et al. | |
| 7,944,352 B2 * | 5/2011 | Drake et al. ............. | 340/539.26 |
| 2009/0185080 A1 | 7/2009 | Lou | |
| 2009/0270030 A1 * | 10/2009 | Jia et al. .......................... | 455/39 |
| 2010/0037069 A1 * | 2/2010 | Deierling et al. ............. | 713/193 |
| 2010/0134338 A1 | 6/2010 | Belz et al. | |
| 2010/0134434 A1 | 6/2010 | Tu | |

FOREIGN PATENT DOCUMENTS

GB   2 360 608   9/2001

OTHER PUBLICATIONS

German Patent Office Search Report, Jul. 3, 2013.

* cited by examiner

*Primary Examiner* — Wanda Z Russell
(74) *Attorney, Agent, or Firm* — Dority & Manning, P.A.

(57) ABSTRACT

A communication device for a remote switch has a control device designed to supply a preparatory signal for preparing a transmission process and a transmission signal for starting the transmission process. A memory device is designed to save one structural information and a parameter for different transmission protocols. A processing device is designed to supply data to be sent, read the structural information and the parameters from the memory device in response to the preparatory signal and, based on the data to be sent and the structural information, create a send packet, and output the send packet and the parameter in response to the transmission signal. A transmission device is designed to wirelessly emit a transmission signal representing the send packet with a transmission characteristic defined by the parameter.

13 Claims, 3 Drawing Sheets

COMMUNICATION DEVICES, RADIO SWITCH AND METHOD FOR COMMUNICATION

FIELD OF THE INVENTION

This invention refers to communication devices, a remote switch and communication processes.

BACKGROUND

Data can be captured and sent via radio communication with a remote switch. A given data transmission protocol is used for sending this data.

German Patent Application DE 101 25 058 A1 of Albsmeier et al. describes a thermally-fed sender with a heat transformer element equipped with a downstream voltage transformer and logic structural group, as well as a data transmission unit.

SUMMARY OF THE INVENTION

This invention creates communication devices, a remote switch and a method for communicating according to the main claims. Advantageous embodiments result from the appended claims and subsequent description.

Additional objects and advantages of the invention will be set forth in part in the following description, or may be obvious from the description, or may be learned through practice of the invention.

There are many different transmission protocols used for transmitting data between two communication devices. A communication device that uses numerous available transmission protocols and is therefore able to receive data or alternately transmit it is highly flexible when it comes to application fields in which the communication device can be used, for example. If the communication device additionally has been adapted to most available transmission protocols or to most available transmission protocols adjustable to the sending installation and, additionally or alternatively, has a receiver adjustable to most available transmission protocols or adapted to most available transmission protocols, the communication device can be built with relatively few components. Advantageously, characteristic protocol data such as structural information and the parameters of most transmission protocols available can be saved in the communication device. This characteristic protocol data can be used in a communication device configured as a sender in order to adapt data to be sent to a transmission format of a selected transmission protocol and to set the transmission device of the communication device to the selected transmission protocol. Analogously, the characteristic protocol data can be used in a communication device configured as a receiver so the received data can be decoded regardless of the knowledge through a transmission protocol used for transmitting the data received.

Advantageously, the communication device can be used as a transceiver. The communication device can have a radio interface for wireless data transmission. The communication device can be executed so it has freely configurable circuits in its radio protocol to lower energy consumption. To minimize energy consumption, an ASIC can be used that has not been developed for an explicit radio protocol (Zigbee, for example), thereby being flexible when it comes to the radio protocols that can be used.

According to an embodiment of the communication device, several different radio protocols can be received simultaneously without this leading to a multiplication of the transceiver components and therefore leading to minimal or no cost multiplication compared to a communication device specified for one single radio protocol. This is advantageous because owing to the heterogeneous market situation for communication devices, many users have created their own standard. When new components with high versatility of use are introduced into the market (such as a self-sufficient micro switch and its receiving unit, for example), they can be equipped so they are compatible with many different radio protocols in order to have good market opportunities.

A universal receiver having the advantages of an ASICS, and therefore of low energy consumption, can be manufactured in this way. It can be based on the principle that the entire sequential control of the universal receiver runs via a state machine that can be parameterized. This lastingly reduces energy consumption, but nonetheless keeps the protocol flexible.

A communication device for a remote switch has the following characteristics:
  A control device designed for supplying a preparatory signal for preparing a transmission process and a transmission signal for starting the transmission process;
  A memory device designed for saving an initial transmission protocol and, in each case, at least one structural information and a parameter for one more transmission protocol;
  A processing device designed for reading one structural information and one transmission protocol assigned to the protocol of one of the data to be sent from the memory device that supplies the data to be sent in response to the preparatory signal, and—based on the data to be sent and the structural information of the assigned transmission protocol—to create a send packet. The processing device is also designed for outputting the send packet and parameter of the assigned transmission protocol after reacting to the transmission protocol; and
  A transmission device designed for wirelessly emitting a transmission signal representative of the send packet with a sending characteristic defined by the parameter of the assigned transmission protocol.

The communication device can be used, for example, for a device that operates self-sufficiently, such as a self-sufficient remote switch. The communication device can be used in the area of home automation or industrial automation, for example. According to this embodiment, the communication device is executed as a transmission device by which data can be wirelessly sent. The control device can be executed to control processes—particularly those pertaining to the transmission process—within the communication device. The control device can be built as a state machine and the memory device as a non-volatile electronic memory. Protocol data of various transmission protocols can be filed away in the memory device and adapted to the transmission protocols typical of the application field of the communication device. This allows memory units to have various protocol data of the communication devices used for various application areas.

The processing device can be executed as a logic device. for example as a micro controller. The processing device can be coupled to the memory device so protocol data from the memory device can be read. The structural information assigned to a transmission protocol can include, for example, data about a protocol frame used for transmitting data—a so-called frame—data, or information used for coding or for a preamble or data protection. The protocol frame can include information about a series of data bits that—according to their position in the series—have been assigned a certain function. For example, a first group of data bits in the series can be assigned a synchronization function, a second group of data bits a preamble function, a third group of data bits an identity function, a fourth group of data bits can be assigned user data sent or to be sent, and a fifth group of data bits can be assigned a checksum function. The structural information of a transmission protocol can define the size of the individual groups, for example. Moreover, the structural information of a transmission protocol can, for example, define a characteristic bit sequence for the specific transmission protocol of the data bits of one or several groups. The parameter assigned to a transmission protocol can, for example, refer to a transmission frequency or a transmitting power by which the transmission signal is emitted by the transmission device, which can be equipped with transmission components adjustable to various transmission protocols with the use of the protocols. Consequently, the number of transmission components can be independent from the number of transmission protocols used. Thus, for several different transmission protocols, only one adjustable send path can be supplied instead of several parallel send paths. The transmission device can represent a radio interface of the communication device.

The processing device can be designed for inserting the data to be sent to a protocol frame of the transmission packet via a certain position of the structural information of the transmission protocol in order to create the transmission packet. In this way, data to be sent from the processing device with different transmission protocols can be prepared in various ways according to the respective transmission protocols before the transmission device sends them.

The processing device can be designed for selecting the transmission protocol assigned to the data to be sent based on information included by the preparatory signal or based on information assigned to the data to be sent. In this way, the individually appropriate transmission protocol can be selected. After the transmission protocol has been selected, the protocol data assigned to the transmission protocol can be read from the memory device. For example, the processing device can be designed for receiving different preparatory signals from the transmission device, in which case one transmission protocol is assigned to each preparatory signal. The processing device can also be designed so it can carry out various applications for generating data to be sent, in which case one transmission protocol is assigned to each application. Furthermore, the processing device can be designed for selecting a transmission protocol depending on a receiver of the data to be sent. In this way, various transmission protocols can be selected for transmitting different types of data.

The processing device can be designed to supply measurement data received through an interface with a sensor as the data to be sent in response to the preparatory signal. In this case, the processing device can be executed for selecting a predetermined transmission protocol for data received through the interface. Additionally or alternatively, the processing device can be executed to encrypt unencrypted data and supply it as data to be sent in response to the preparatory signal. Thus, the communication device can be used both for a sensor system and safety-relevant systems.

In accordance with an embodiment, the control device can be executed as a so-called state machine and the processing device as a micro controller employing known architectures. The state machine makes it possible to ensure very fast sequential control within the communication device.

Another communication device for a remote switch has the following characteristics:

A memory device designed for saving structural information for a first transmission protocol and for at least an additional transmission protocol;

A processing device designed for processing data;

A receiver designed for receiving a wirelessly transmitted receiving signal and for supplying it as an input signal; and A decoding device designed for reading the structural information of the first transmission protocol and of at least one additional transmission protocol from the memory device, for decoding the input signal using the structural information, and for determining the input data contained in the input signal and supply it to the processing device.

The additional communication device can be used analogously to the communication device mentioned above. In accordance with this embodiment, the communication device can be executed as a receiver for receiving data wirelessly. At the same time, only one receiving path instead of several parallel receiving paths can be provided for several different transmission protocols. The communication device can have a control device that can be designed for controlling processes, especially those related to the reception, within the communication device. The control device can be executed as a state machine. The memory device can be executed as non-volatile electronic memory and protocol data of different transmission protocols can be filed away in it. The protocol data saved in the memory device can be adapted to the transmission protocols typical of a corresponding application field of the communication device. Consequently, the memory devices of the communication devices used in various application fields can have different protocol data. The decoding device can be coupled to the memory device so it is able to read the protocol data from the memory device. The structural information assigned to a transmission protocol can include suitable information or data for decoding the input signal. The decoding device can be executed as a correlation device. The decoding device can be designed in such a way that it can correlate the input signal with the structural information saved in the memory device in order to determine the input data. The processing device can be executed as a logic device. For example, the processing device can be executed as a micro controller and designed to process or forward the input data.

Another communication device for a remote switch includes the following features:

A control device designed for supplying a preparatory signal that will prepare a transmission process and a transmission signal for starting the transmission process;

A memory device designed for saving in each case one structural information and one parameter for a first transmission protocol and for at least another transmission protocol;

A processing device designed for supplying data to be sent, reading from the memory device one structural information and one of the parameters of the transmission protocol assigned to the data to be sent in response to the preparatory signal and, based on the data to be sent and the structural information of the assigned transmission protocol, create a send packet, and designed to output the send packet and the parameter of the assigned transmission protocol in response to the transmission signal;

A transmission device designed for emitting a wireless transmission signal representative of the send packet with a sending characteristic defined by the parameter of the assigned transmission protocol;

A receiver designed for receiving a wirelessly transmitted receiving signal and for supplying it as an input signal; and A decoding device designed for reading the structural information of the first transmission protocol and of at least an additional transmission protocol from the memory device and for decoding the input signal by employing the structural information, for determining the input data contained in the input signal and supply them to the processing device.

This additional communication device can be used analogously to the communication devices mentioned above. In accordance with this embodiment, the communication device is executed as one suitable for transmitting and receiving data that is sent wirelessly.

Generally speaking, the processing device can be designed for filing away update data received through a programming interface in the memory device. For example, the processing device can be executed to read, via a programming interface, structural information and a parameter for a new transmission protocol in response to a programming signal and to file them away in the memory device. In this way, the communication device can be adapted to one or several new transmission protocols.

The communication device can be equipped with activation equipment that can be designed for changing the equipment in the communication device from an energy savings mode to an operational mode in response to an activation signal. The activation signal can be transmitted to the communication device wirelessly or through a wire. In the energy savings or sleep mode, the equipment can be turned off or just be minimally functional. In the energy savings mode, the equipment needs no energy or less energy than in operational mode. In the operational mode, the equipment can be fully functional. If the various kinds of equipment are in operational mode, the activation equipment can be designed to change it to the energy savings mode as soon as the equipment's functionality is no longer needed. In the communication device used as a transmitter, the activation equipment can be executed, for example, to change the control device, the memory device, the processing device and the transmission device to the operational mode or vice versa. In the communication device used as a receiver, the activation equipment can be executed, for example, to change the memory device, the processing device, the receiver and the decoding device from the energy savings mode to the operational mode. In the communication device used as transmitter and receiver, the activation equipment can be executed, for example, to change the control device, the memory device, the processing device, and the decoding device from the energy savings mode to the operational mode or vice versa. The activation equipment makes it possible to lower the total energy consumption of the communication device drastically.

A remote switch is characterized in that it is equipped with a communication device according to one of the embodiments described above. The communication device can be used to receive a control signal sent wirelessly and to control a function of the remote switch. The communication device can be used to transmit a switch signal of the remote switch wirelessly. By means of the communication device, an activation of the remote switch can be determined and sent as the switch signal. To accomplish this, the communication device can be integrated to a housing of the remote switch. At least a portion of the mechanical energy needed for activating the remote switch through an activator can be converted to electrical power by a generator of the remote switch. The electrical power can be used for operating the communication device. In this way, the remote switch and the communication device can be operated self-sufficiently.

A communication method includes the following steps:

Supply of a preparatory signal for preparing a transmission process;

Supply of the data to be sent, selection of a transmission protocol assigned to the data to be sent from numerous transmission protocols and reading of structural information and a parameter of the transmission protocol assigned to the data to be sent from a memory device, and creation of a send packet based on the data to be sent and the structural information, in response to the preparatory signal;

Supply of a transmission signal for starting the transmission process;

Output of the send packet and the transmission protocol parameter in response to the transmission signal; and Wireless sending of a transmission signal representative of the send packet with a transmission characteristic defined by the parameter.

The method can be advantageously employed in connection with a communication device foreseen for data transmission.

Another communication method comprises the following steps:

Receipt of a wirelessly transmitted receiving signal and supply of the receiving signal as an input signal;

Reading of structural information of a first transmission protocol and at least one another transmission protocol from a memory device;

Decoding the input signal by means of structural information in order to determine the input data contained in the input signal; and Supply of the input data.

The method can be advantageously used in connection with a communication device foreseen for receiving data.

A communication device can be an electrical unit that processes sensor signals and emits control signals depending on it. The device can be equipped with one or several suitable interfaces that can be designed as software or hardware. In a hardware design, the interfaces can be part of an integrated circuit in which the device's functions are implemented, for example. The interfaces can also be self-contained integrated switching circuit or at least consist in part of discrete structural elements. In a software design, the interfaces can be software modules present on a micro controller in addition to other software modules.

Advantageous is also a computer program with a program code that can be saved on a machine-readable carrier such as a semiconductor memory used for implementing one or several processes according to the embodiments described above when the program is executed on a computer or a device.

BRIEF DESCRIPTION OF THE DRAWINGS

The invention is explained in more detail with the help of the attached drawings, which show.

DETAILED DESCRIPTION

Figure 1:
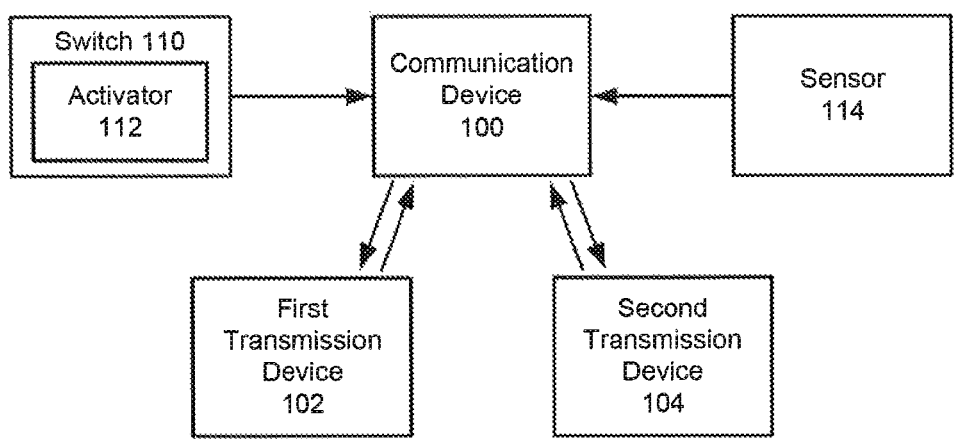
FIG. 1 is a schematic representation of a communication system.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

In the description of preferred embodiments of this invention given below, the same or a similar list of references is used for the elements shown in the various figures that have similar effects to do away with a repeated description of these elements.

FIG. 1 shows a schematic representation of a communication system in accordance with an embodiment of this invention. The communication system is equipped with a communication device 100 and exemplarily with a first communication device 102 and a second communication device 104. The communication device 100 has been designed so it can communicate wirelessly with the first communication device 102 using a first transmission protocol. In this example, the communication device 100 is designed to emit, via a transmission interface and using the first transmission protocol, a first transmission signal to the first transmission device 102 and to receive, via a receiving interface and using the first transmission protocol, a first receiving signal transmitted from the first transmission device 102. Moreover, the communication device 100 is designed so it can communicate wirelessly with the second transmission device 104 using a second transmission protocol. For example, the communication device 100 is designed to emit a second transmission signal, via the transmission interface and using the second transmission protocol, to the second transmission device 104 and to receive, via the receiving interface and using the second transmission protocol, a second receiving signal from the second transmission device 104.

The communication system can have other transmission devices (not shown) able to communicate with the communication device 100 using the first, the second, or several additional transmission protocols. Deviating from what is shown in FIG. 1, one or several transmission devices 102, 104 can also be executed only as receivers or only as transmitters.

In accordance with an embodiment, the communication device 100 is coupled to a switch 110. The arrangement consisting of communication device 100 and switch 110 can be used as remote switch. The communication device 100 can be arranged in a housing of the switch 110. The switch has an activator 112 that can be mechanically activated and which can be, for example, a push button or toggle switch. If the activator 112 is activated, an activation signal is transmitted to an input interface of the communication device 100. In response to the activation signal, the communication device 100 is designed to generate the first transmission signal using the first transmission protocol and to emit it to the first transmission device 102, for example. In this way, information about the activation of the switch 120 can be transmitted to the first transmission device 102. An activating force exerting its effect on the activator 112 can be utilized with the help of a generator for generating the electrical power needed by the communication device 100.

In accordance with an embodiment, the communication device 100 is coupled to a sensor 114. The sensor 114 can be suitable for determining a physical or electrical magnitude. The sensor can be a temperature sensor, a pressure sensor, or a voltage sensor. The sensor 114 (which can represent, for example, a value of a measuring magnitude determined by the sensor 114) is designed for transmitting a sensor signal to an input interface of the communication device 100. The communication device 100 is designed to generate the second transmission signal using the second transmission protocol based on the sensor signal, for example, in response to the second receiving signal from the second transmission device 104 and to emit it to the second transmission device. In this way, information can be transmitted to the second transmission device 104 via a measured value registered by the sensor 114.

Figure 2:
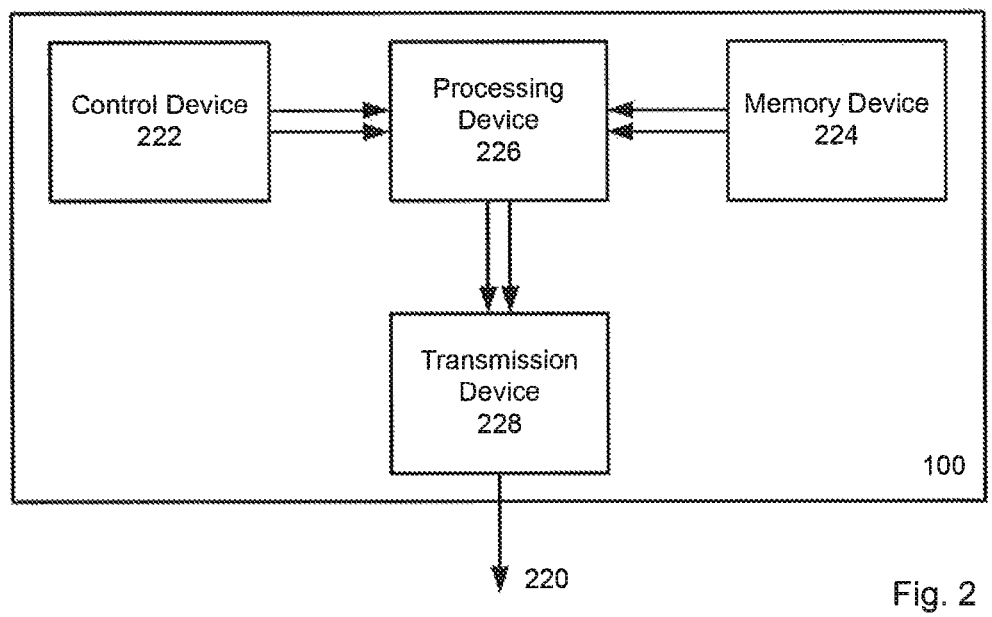
FIG. 2 is a schematic representation of a communication device.

FIG. 2 shows a schematic representation of a communication device 100 according to an embodiment of this invention. The communication device 100 has been executed as a transmission device and designed to emit a transmission signal 220 wirelessly via a radio interface. The communication device 100 can be used with the communication system shown in FIG. 1, for example. The communication device has a control device 222, a memory device 224, a processing device 226, and a transmission device 228.

The memory device 224 is designed for saving several transmission protocols, as well as structural information and a parameter for each one. For example, the memory device 224 has been designed for saving initial structural information and a first parameter for a first transmission protocol and second structural information and a second parameter for a second transmission protocol.

The control device 222 is designed for supplying a preparatory signal for preparing a transmission process in the processing device 226. For example, the control device 222 can be designed to emit the preparatory signal in response to the initial operation of the communication device 100 or in response to a trigger signal generated by an equipment of the communication device 100 or received by the communication device 100.

The processing device 226 is designed to supply the data to be sent in response to the preparatory signal. The data can be data saved in the processing device 226 or data read by the processing device 226 via an interface. The processing device is furthermore designed to select a transmission protocol assigned to the data. A selection of the transmission protocol can, for example, depend on the evaluation of the preparatory signal, an evaluation of the moment the preparatory signal is received, or an evaluation of the data. The processing device is designed to read the structural information and the parameter assigned to the selected transmission protocol from the memory device 224 and to insert the corresponding send packet in the selected transmission protocol using the structural information in the memory device 224.

The control device 222 is designed to supply a transmission signal to the processing device 226. For example, the control device 222 can be designed to supply the transmission signal at a predetermined time after the preparatory signal or in response to a signal of the processing device 226. The control device 222 and the processing device 226 can be built as separate integrated circuits or as a common integrated circuit.

The processing device 226 is designed to receive the transmission signal from the control device 222 and to output the send packet to the transmission device 228 in response to the transmission signal and the parameter of the selected transmission protocol read from the memory device 224.

The transmission device 228 is designed to receive the parameter and the send packet. The transmission device 228 is designed, using the parameter, to adjust to a transmission characteristic of the transmission protocol selected by the processing device 226 with regard to the data to be sent. For example, the parameter can define a transmission frequency and, additionally or alternatively, a transmitting power assigned to the selected transmission protocol. Based on the send packet and the transmission characteristic the transmission device 228 has adjusted to, the transmission device is designed to generate the transmission signal 220 and transmit it wirelessly.

If another transmission protocol is selected by the processing device 226 for additional data to be transmitted, then the transmission device 228 is designed to adjust to another transmission characteristic assigned to the other transmission protocol according to a parameter assigned to the other transmission protocol. Thus, various transmission characteristics of the transmission device 228 can be adjusted by different parameters supplied to the transmission device 228 from the processing device 226. To emit transmission signals with different transmission characteristics through different transmission protocols, the transmission device 228 can use one and the same transmitting component, such as one antenna, for example.

For example, the transmission device 228 can be equipped with a carrier frequency generator able to generate different carrier frequencies depending on the parameters. Thus, a carrier frequency generator can be used for generating different carrier frequencies for different transmission protocols. For example, the transmission device 228 can have a modulator able to generate different modulations of the transmission signal 220 depending on the parameters. Thus, a modulator can be used for generating different modulation for different transmission protocols. For example, the transmission device 228 can be equipped with a high-frequency amplifier that, depending on the parameters, can emit the transmission signal 220 with various transmission powers to an antenna in the communication device. In this way, a high-frequency amplifier can be used for generating different transmission powers for various transmission protocols.

Figure 4:
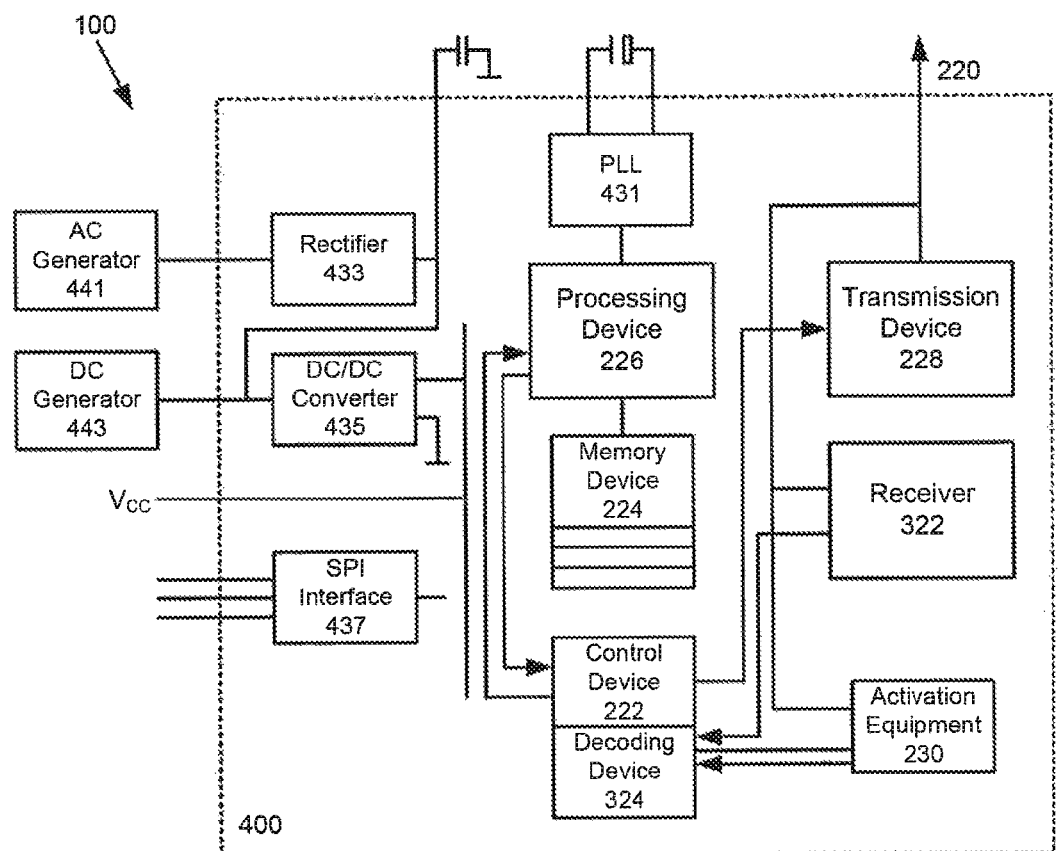
FIG. 4 is a block diagram of a communication device.

In accordance with en embodiment, the communication device 100 has activation equipment 230 (FIG. 4). The activation equipment 230 is designed for receiving an activation signal and to change some or all the devices 222, 224, 226, 228 from an energy savings mode to an operational mode in response to the activation signal. For example, the control device 222 can be designed for emitting the preparatory signal to the processing device 228 in response to a change in the operational mode.

Figure 3:
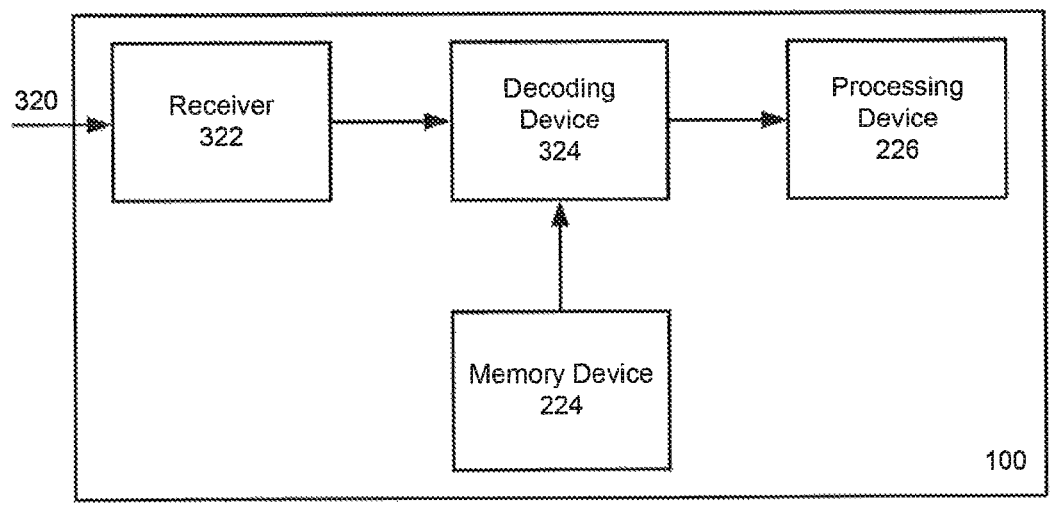
FIG. 3 is a schematic representation of another communication device.

FIG. 3 shows a schematic representation of a communication device 100 according to another embodiment of this invention. The communication device 100 has been executed as a receiver and designed to wirelessly receive a receiving signal 320 via a radio interface. The communication device 100 can be used, for example, with the communication system shown in FIG. 1. The communication device 100 has a receiver 322, a decoding device 324, a memory device 224, and a processing device 226.

The memory device 224 is designed for saving structural information for several transmission protocols—for example, for saving initial structural information for a first transmission protocol and second structural information for a second transmission protocol.

The receiver 322 is designed for receiving the wirelessly transmitted receiving signal 320 and for supplying it to the decoding device 324 as an input signal. In doing this, the receiving signal 320 can be transmitted with the first transmission protocol, for example. The receiver 322 is designed for receiving additional receiving signals 320 that are transmitted with the second or additional transmission protocols. So receiving signals that were emitted with different transmission characteristics defined by different transmission protocols can be received, the receiver 322 can use one and the same receiving component such as one antenna, for example. The receiver 322 can therefore be executed as a receiver adapted for broadband.

The decoding device 324 is designed for using the structural information from the memory device 224 that was saved so the input signal received by the receiver 322 can be decoded in order to determine the input data transmitted by the receiving signal 320 to the communication device 100. The decoding device 324 is designed to emit the input data to the processing device 326 for further processing or forwarding.

In accordance with an embodiment, the communication device 100 of FIG. 3 has activation equipment 230. The activation equipment 230 (FIG. 4) is designed to receive an activation signal that changes the devices 222, 224, 226, 228 in each case from an energy savings mode to an operational mode in response to the activation signal.

FIG. 4 shows a block diagram of a communication device 100 according to an embodiment of this invention. The communication device 100 is equipped with a radio ASIC 400. Inside the radio ASIC 400 there is a control device 222 in the form of a so-called state machine, a memory device 224 in the form of an EEPROM, a processing device 226 in the form of a micro controller unit (MCU), a transmission device 228 in the form of a transmitter Tx, activation equipment 230 in the form of a so-called wake-up receiver, a receiver 322 and, a decoding device 324 in the form of a correlator. All of them can be the devices already described above. Furthermore, a PLL 431, a rectifier 433, a DC/DC converter 435 and a SPI interface 437 have been built inside the radio ASIC 400.

The communication device 100 also has an alternating current (AC) generator 441 and additionally or alternatively a direct current (DC) generator 443. The generators 411, 433 can be generators suitable for self-sufficient energy supply.

The AC generator 441 is designed for supplying alternating current to the rectifier 433. The DC generator 443 and the rectifier 433 are designed to supply direct current to the DC converter 435. The DC converter 435 has been designed in such a way that it can supply the radio ASIC 400 with operating voltage. Additionally or alternatively, the radio ASIC 400 is equipped with an interface to a supply voltage Vcc through which the radio ASIC 400 can be additionally or alternatively supplied.

The control device 222 is linked to the processing device 226 and the transmission device 228 via signaling lines. The control device 222 is designed to emit signals to the processing device 226 via signaling lines and to receive signals from the processing device 226, as well as to emit signals to the transmission device 228. The control device 222 in the form of a state machine allows very easy sequential control within the ASIC 400.

The transmission device 228 is executed to emit transmission signals 220, for example in the frequency bands 868 . . . 870 MHz and 902 . . . 928 MHz, via an antenna of the communication device 100. The transmission device 228 is designed to carry out a frequency shift FSK.

The memory device 224 can comprise several 1024-bit entries (32-bit ID), for example. In the memory device 224, information about protocol frame, user data position, spread and frequency, in each case for various transmission protocols, can be saved.

The processing device 226 can be executed as an 8-bit micro controller with 16 k ROM, a 10-bit A/D converter. 6 I/O ports and a digital bus interface (e.g. an SPI interface (serial peripheral interface)). The processing device 226 is connected to the PLL 431 and the memory device 224 via electrical lines.

The SPI interface 437 is executed as an external interface of the radio ASIC 400 and designed so it can receive data and transmit them to the digital bus interface of the processing device 226, for example.

The receiver 322 is executed so it can receive wirelessly emitted receiving signals sent to the communication device 100. To accomplish this, the receiver 322 is, like the transmission device 228 and the activation equipment 230, coupled to the antenna of the communication device 100. The receiver 322 is designed to carry out a frequency shift FSK. The receiver 322 is linked to the decoding device 324 via a line and designed to emit digital input signals to the decoding device 324. The decoding device 324 is designed to generate a user signal through a correlation of the digital input signal. To achieve this and with respect to the input signal, the decoding device 324 can fall back on information about a used spread of the input signal, on a user data position in the input signal filed away in the memory device, and on a known data record.

The activation equipment 230 is linked to the decoding invoice 324 through lines.

In accordance with an alternative embodiment, some or all components or functions integrated to the radio ASIC 400 can be built with separate structural elements or circuits.

For example, some of the components can be built with integrated circuits. Thus, an integrated voltage converter in the form of a chip can be used as voltage converter 435 that—apart from a rectifier—also has an arrangement that adjusts a variable input voltage to a firmly defined output voltage level.

Likewise, the DC/DC converter 435 can also be built as an integrated circuit.

Central processing units (CPUs) of varied size and performance can be used as micro controllers 226.

Transceiver components modified in the most varied ways can be used as transceivers 228, 322.

The radio ASIC 400 is suitable for emitting flexible, software-defined radio protocols with very little energy.

A radio receiver capable of changing most of its functions to a highly energy-saving sleep mode can be used as wake-up receiver 230, while the RF front end of the radio receiver remains active and waits for a defined password to change the radio receiver and additional components of the radio ASICS 400 from the sleep mode to the active state, in which signal processing and communication processes can be processed, contrary to the sleep mode.

The communication device 100 shown in FIG. 4 is described below with the help of an embodiment of a universal receiver. The universal receiver has the advantages of an ASIC with regard to energy consumption, and is based on the principle that the entire sequential control runs through a state machine that can be parameterized to lastingly lower energy consumption but nonetheless maintain the protocol of the universal receiver flexible. Even if the description below assumes a radio ASIC 400, the circuit described with the help of the radio ASIC 400 can also be built with separate circuits or structural elements.

The circuit of the radio ASIC 400 gets electrical power from a supply input of the radio ASIC 400 via one of the generators 441, 443 or via a second interface of the radio ASIC 400, which can be directly connected to a supply voltage Vcc. In the first case, in which an energy generator 441 is used with an alternating voltage signal, a rectifier 433 and a DC/DC converter 435 for adjusting a defined voltage level are foreseen for conditioning the voltage. Alternatively, a generator 443 with a DC output current can be integrated after the rectifier 433 for minimizing losses. The electrical power made available supplies all partial areas of the electrical circuit of the radio ASIC 400.

The core of the electrical circuit of the radio ASIC 400 is a state machine 222 through which all processes run in a controlled way inside the circuit. In detail, the state machine 222 is responsible for generating the radio protocol during the transmission process and decoding the messages in the receiving mode. To parameterize the state machine 222, a programmable EEPROM 224 has been foreseen. It contains no data that influences the operation of the state machine 222 but information pertaining to the protocol setup. The EEPROM 224 has been designed so it can file away information about several products at the same time.

The protocols, according to all known designs of the application segment in which the radio ASIC is used, are based on a uniform structure that will be described below with the help of FIG. 5. In addition, more data about data rate, precise frequency in which the protocol is transmitted, synchronization, preambles, transmitting power and CRC are given. Additionally, the data positions that can be freely inserted in the EEPROM 224 have been filed away. In a normal situation, these are the identity (ID) of the circuit of the radio ASIC 400, which is issued specifically during manufacturing, and the information data.

The information data is supplied by the very small micro controller 226, which is triggered by the state machine 222 so that a program executed in the micro controller 226 supplies the data for the protocol after the data has been retrieved. This is about generating measurement data or carrying out a decoding, for example. Another task of the micro processor 226 is the programming of the EEPROM 224. The programming should likewise take place via the micro controller 226. Several ports are supplied for the functions of the micro controller 226. These ports are an A/D converter for measuring voltages, digital I/O ports, and an SPI interface for wire communication as used on the EOL or for using the circuit as receiver in a larger circuit compound. Once the protocol has been completed, it is controlled via the state machine 222, forwarded together with the parameters through frequency and power to the transmitter 228 (Tx), which adjusts itself with the help of the parameters and transmits the information.

The receiving path with the receiver (Rx) 322 contains a receiver tuned for broadband, which transforms the entire radio band (in the 868 MHz example, 2 MHz bandwidth) to the basic band via the mixer stage. There, it is converted to digital via an A/D converter.

The received signals are fed to a correlator 324, which is able to identify protocols with the help of protocol structures from the EEPROM 224 and extract user information. After the user information has been obtained, the data packets are given to the micro controller 226 via the state machine 222 for further processing and communication with the periphery.

In addition to the standard receiver (Rx) 322, a wake-up receiver 230 has been integrated for the receiving operation whose task is to reduce overall usage of the radio ASIC 400 circuit. The wake-up receiver 230 allows one to turn off all circuit components of the radio ASIC 400, even the state machine 222, until a pre-defined wake-up code is received by the wake-up receiver 230. The wake-up receiver 230 can be manufactured with particularly energy-savings technology. After the wake-up code was correctly received, the wake-up receiver 230 wakes up the state machine 222 that controls the subsequent communication procedure.

Figure 5:
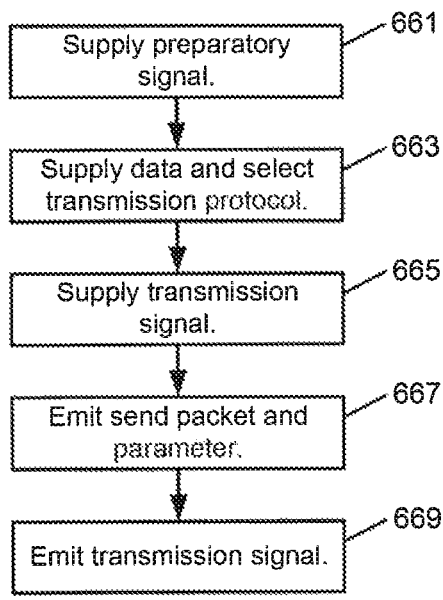
FIG. 5 is structural information of a transmission protocol.

FIG. 5 shows structural information 500 of a transmission protocol according to an embodiment of this invention. A general form of a radio protocol is shown. The structural information 500 can be saved, for example, in the memory devices described above and used for generating the transmission signals described previously and for decoding the receiving signals received. The structural information 500 defines a protocol frame with several groups of bits that represent successively, from left to right, synchronization bits Sync 501, preamble bits 502, identification bits ID 503, user data bits Data 505 and checksum bits CRC 505.

Figure 6:
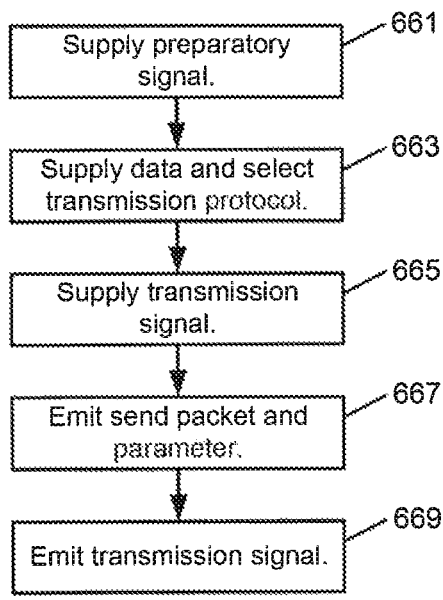
FIG. 6 is a sequence diagram of a communication method.

FIG. 6 shows a flow process diagram of a communication method in accordance with an embodiment of this invention. The method allows, for example, be carried out with the help of devices of the communication device described in FIGS. 1 through 4. In step 661, a preparatory signal for preparing the transmission process is supplied. In step 663, data to be sent is supplied in response to the preparatory signal, a transmission protocol assigned to the data to be sent is selected from numerous transmission protocols, and structural information and at least one parameter of the transmission protocol assigned to the data to be sent are read. Furthermore, in step 661, a transmission signal based on the data to be sent and the structural information is generated. In step 665, the transmission signal is supplied for starting the transmission process. In step 667, the send packet and the transmission protocol parameter are emitted in response to the transmission signal. In step 669, a transmission signal representing the send packet is emitted with a transmission characteristic defined by the transmission protocol parameter.

Figure 7:
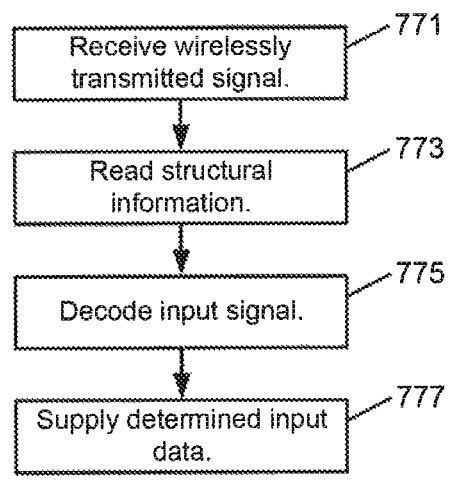
FIG. 7 is a sequence diagram of a communication method.

FIG. 7 shows a flow process diagram of a communication method for in accordance with an embodiment of this invention. The method can be carried out, for example, with the help of devices of the communication device described in FIG. 4. In step 771, a wirelessly transmitted receiving signal is received and supplied as digital input signal. In step 773, structural information of at least two transmission protocols are read from a memory unit. In step 775, the input signal is decoded employing the structural information read. In this way, the input data contained in the input signal are determined. In step 777, the input data that were determined are supplied.

The embodiments described and shown in the figures have been selected for exemplarily purposes only. Different embodiments can be combined fully with one another or with regard to individual characteristics. Also, an embodiment can be supplemented by characteristics of another embodiment. Furthermore, process steps according to the invention can be executed repeatedly in an order other than the one described.

The invention claimed is:

1. A communication device configured for remote switch activation, the communication device comprising:
   a control device configured to supply a preparatory signal for preparing a transmission process and a first transmission signal for starting the transmission process;
   a memory device having stored therein structural information data and a parameter for both an initial transmission protocol and at least one additional transmission protocol, the structural information data of the initial transmission protocol and the structural information data of the at least one additional transmission protocol each comprising a respective protocol frame for data bits, the parameter of the initial transmission protocol and the parameter of the at least one additional transmission protocol each comprising at least one of a respective transmission frequency or a respective transmission power;
   a processing device in communication with the control device and the memory device, the processing device configured to supply data to be transmitted and:
      in response to the preparatory signal, read from the memory device the structural information data and the parameter for an assigned one of the transmission protocols stored within the memory device for the data to be transmitted;
      create a send packet based on the data to be transmitted and the assigned one of the transmission protocols; and
      output the send packet and the parameter of the assigned one of the transmission protocols in response to the first transmission signal from the control device; and
   a transmission device configured to wirelessly emit a second transmission signal containing the send packet and a transmission characteristic defined by the parameter of the assigned one of the transmission protocols.

2. The communication device as in claim 1, wherein the processing device creates the send packet by inserting the data to be transmitted into a defined position of the protocol frame of the assigned one of the transmission protocols.

3. The communication device as in claim 1, wherein the processing device is configured to select the assigned one of the transmission protocols for the data to be transmitted based on information contained in the preparatory signal or information assigned to the data to be transmitted.

4. The communication device as in claim 1, wherein the processing device is in communication with a sensor and receives measurement data from the sensor, the processing device configured to include the measurement data in the data to be transmitted.

5. The communication device as in claim 1, wherein the processing device is further configured to encrypt data, and to include the encrypted data in the data to be transmitted.

6. The communication device as in claim 1, wherein the control device is a state machine, and the processing device is a micro-controller.

7. The communication device as in claim 1, wherein the processing device is configured to file update data in the memory device via a programming interface with the memory device.

8. The communication device as in claim 1, further comprising an activation device configured to change components of the communication device from an energy savings mode to an operational mode in response to an activation signal from the activation device.

9. The communication device as in claim 1, further comprising a remote switch to initiate a transmission via the communication device.

10. A communication device configured for remote switch activation, the communication device comprising:
   a memory device having stored therein structural information data and a parameter for both an initial transmission protocol and at least one additional transmission protocol, the structural information data of the initial transmission protocol and the structural information data of the at least one additional transmission protocol each comprising a respective protocol frame for data bits, the parameter of the initial transmission protocol and the parameter of the at least one additional transmission protocol each comprising at least one of a respective transmission frequency or a respective transmission power;
   a processing device in communication with the memory device;

a receiver in communication with the processing device, the receiver configured to receive a wirelessly transmitted signal and supply the wirelessly transmitted signal as an input signal to the processing device; and a decoding device configured to read the structural information for the transmission protocols from the memory device, and to use the structural information to decode the input signal and supply data contained in the input signal to the processing device.

11. A communication device configured for remote switch activation, the communication device comprising:

a control device configured to supply a preparatory signal for preparing a transmission process, and a first transmission signal for starting the transmission process;

a memory device having stored therein structural information data and a parameter for an initial transmission protocol and at least one additional transmission protocol, the structural information data of the initial transmission protocol and the structural information data of the at least one additional transmission protocol each comprising a respective protocol frame for data bits, the parameter of the initial transmission protocol and the parameter of the at least one additional transmission protocol each comprising at least one of a respective transmission frequency or a respective transmission power;

a processing device in communication with the control device and the memory device, the processing device configured to supply data to be transmitted and:

in response to the preparatory signal, read the structural information data and parameter for an assigned one of the transmission protocols for the data to be transmitted from the memory device;

create a send packet based on the data to be transmitted and the assigned one of the transmission protocols; and output the send packet and the parameter of the assigned one of the transmission protocols in response to the first transmission signal from the control device; and a transmission device configured to wirelessly emit a second transmission signal containing the send packet and a transmission characteristic defined the parameter of the assigned one of the transmission protocols;

a receiver in communication with the processing device, the receiver configured to receive a wirelessly transmitted signal and supply the wirelessly transmitted signal as an input signal to the processing device; and a decoding device configured to read the structural information for the transmission protocols from the memory device, and to use the structural information to decode the input signal and supply data contained in the input signal to the processing device.

12. A communication method implemented via a communication device, the communication method comprising:

generating and supplying a preparatory signal for preparing a transmission process;

supply data to be transmitted in the transmission process;

assigning a transmission protocol to the data to be transmitted from a plurality of different transmission protocols stored in a memory device;

reading structural information and a parameter of the assigned transmission protocol from the memory device, the structural information data of the assigned transmission protocol comprising a protocol frame for data bits, the parameter of the assigned transmission protocol comprising at least one of a transmission frequency or a transmission power;

create a send packet based on the data to be transmitted and the structural information of the assigned transmission protocol;

supply a first transmission signal for starting the transmission process;

in response to the first transmission signal, outputting the send packet and the parameter of the assigned transmission protocol; and wirelessly emit a second transmission signal containing the send packet and a transmission characteristic defined by the parameter of the assigned transmission protocol.

13. A communication method implemented via a communication device, the communication method comprising:

receiving a wirelessly transmitted signal, and supplying the signal as an input signal to a processing device;

in a memory device, storing structural information data and a parameter for both an initial transmission protocol and at least one additional transmission protocol, the structural information data of the initial transmission protocol and the structural information data of the at least one additional transmission protocol each comprising a respective protocol frame for data bits, the parameter of the initial transmission protocol and the parameter of the at least one additional transmission protocol each comprising at least one of a respective transmission frequency or a respective transmission power;

reading the structural information for the transmission protocols from the memory device, and using the structural information to decode the input signal; and supplying data from the decoded input signal with the input signal to the processing device.

* * * * *